Jan. 30, 1968 F. MOOGK 3,365,967
STEPLESS VARIABLE V-BELT DRIVING GEAR WITH ASYMMETRIC V-BELT
Filed June 7, 1965

Inventor:
FRIEDRICH MOOGK ial with natural rubber is at about 70° C. If this temperature is exceeded, the life-time of the V-belt is shortened. The reasons for the heating up are:

United States Patent Office 3,365,967
Patented Jan. 30, 1968

3,365,967
STEPLESS VARIABLE V-BELT DRIVING
GEAR WITH ASYMMETRIC V-BELT
Friedrich Moogk, Wallgrabenstrasse 14,
Werdohl-Kleinhammer, Germany
Filed June 7, 1965, Ser. No. 461,778
12 Claims. (Cl. 74—230.17)

The present invention relates to a stepless variable V-belt driving gear with a V-belt of asymmetric cross-section and correspondingly shaped pulleys for the transmission of power under maintentance of a set driving speed. In particular, it relates to V-belts the size proportions regarding height and width and the face angles of which in combination with other measures in the driving gear itself permit to considerably increase the transmission of power of such gears.

Stepless variable gears with asymmetric V-belts generally operate with two-pulley regulation, fixed shaft distance and automatic regulation of the conical pulleys. Stepless variable gears with symmetric V-belts, so-called standard V-belt driving gears with two or four pulley regulation, which operate with fixed as well as with variable shaft distance, have well proved in practice; however, they have the disadvantage of a small range of variation. A wider range of variation can be attained with such driving gears only when using finger-like interlacing conical pulley sections; in such arrangements, however, the transmission of power is reduced by the wave-like position of the V-belt i nthe finger-like interlaced pulleys. For a stepless control with V-belts over a wider range, there have been used large width V-belts. Due to the symmetric cross-section of such large width V-belts, the transmission of power is limited by the slip of these belts and by the fact that they heat up to a higher degree than standard V-belts do, because relatively large parts of their cross-section do not participate in the transmission, but are subject to a considerable milling which causes rapid heating up. In addition, such large width V-belts are liable to bending in their profile which causes that the flanks of the belts are partially lifted from the pulley sections, which also limits any greater transmission of power.

Accordingly, it is an object of the present invention to provide a stepless variable V-belt driving gear which permits the transmission of specifically higher loads with good regulating efficiency. It is a further object of the invention to effect the transmission of power under maintenance of a driving speed set at a constant value.

Furthermore, it is an object of the invention to provide a good heat abduction of the V-belt pulleys by selecting a suitable material for said pulleys.

Finally, it is an object of the invention to reduce milling of the V-belt by selecting a suitable profile and also to reduce the tendency of the belt to slip between the pulleys.

Now, we have found that the above objects are met and that a more efficient transmission of power under maintenance of a set driving speed over a wide regulation range is achieved by the stepless variable V-belt driving gear of the present invention, which comprises in combination (a) An asymmetric V-belt whose one side flank is flat or inclined up to 1° and whose other side flank is inclined by about 19°, said V-belt being provided with cord reinforcement material and having in the neutral zone a ratio of height to width $h:w = 1:1$ up to $1:3$, (b) A load-dependent axial initial load arrangement at the driving pulley consisting of a cammed hub of the conical section of the pulley, at least one roller fixed on the shaft of the respective flat pulley section located in the path of the cam of said hub, and a spring positioned parallel thereto, (c) Pulley sections consisting of a self-hardening, wear-resisting aluminium alloy with Zn, Si, Mg, Cu and Fe components and having a good thermal conductivity.

The other features of the driving gear of the invention such as the teeth of the V-belt and the crowned face of the conical pulley section shall be considered features of the invention in combination with the other above-described features only.

The driving V-belt gear of the present invention permits to considerably increase the efficiency under consideration of all factors serving for the reduction of a heating up of the V-belt. As is known, the efficiency of V-belt driving gears is limited by the temperature such V-belts can take up.

The temperature limit of a V-belt from synthetic material with natural rubber is at about 70° C. If this temperature is exceeded, the life-time of the V-belt is shortened. The reasons for the heating up are:

(a) The milling which takes place on bending of the revolving V-belt, especially at higher bending reversal numbers;

(b) The too high slippage of the V-belt on the pulleys in the case of insufficient belt tension, in particular during short time overloads;

(c) The deformation of the belt cross-section (bending of the profile) of conventional large width V-belts at full-load, causing that parts of the flanks of the V-belt do not fully contact the contact surface of the pulley sections, whereby the specific surface pressure is exceeded;

(d) The poor heat abduction by the material of the pulleys.

These disadvantages are overcome in advantageous manner by the driving gear of the present invention in which (e) Milling and therewith heating up is reduced by the use of an asymmetric V-belt with narrow profile;

(f) The V-belt is always maintained at a correct tension by the use of a torque curve, this tension being maintained at any load, even at overload, as well as on starting. Slippage is thereby reduced to a negligible value and also the friction heat is further reduced;

(g) A higher side stiffness of the V-belt is secured by the narrow profile of the V-belt, whereby full contact of the V-belt with the contact surface of the pulley sections is maintained, which further reduces heating up and wear of the regulating V-belt;

(h) The special aluminium alloy mentioned above secures good heat abduction.

Furthermore, an advantageous feature of the driving gear of the invention is that in the case of changing loads the compression spring presses pulley sections and V-belt together in such a manner that the V-belt is always pulling and that shocks caused by switching or reversal are absorbed and that weaving of the V-belt is prevented.

An exemplary embodiment of a combination of these special features of the present invention is illustrated in the accompanying drawings.

Figure 1:
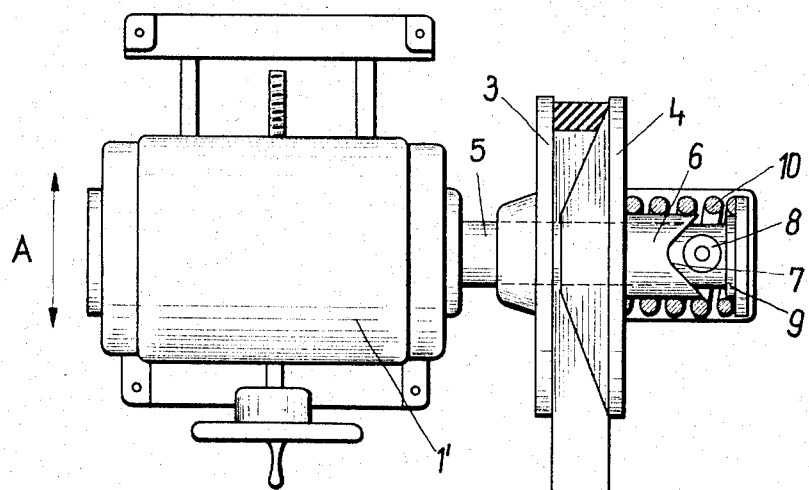
FIGURE 1 shows schematically a stepless V-belt driving gear with one pulley regulation.

For illustrating the driving gear of the present invention, a driving gear with one pulley regulation has been selected, the gear regulation of which is carried out by means of an adjustable motor slide or a hinged motor plate (not shown) through motor 1' itself, the pulleys 3 and 4 being fixed slidably with motor 1' in direction of arrow A. The asymmetric V-belt 2, which is a V-belt having one almost flat flank and one oblique flank, angle $\beta$=about 1° and angle $\alpha$=about 19°, passes from the pair of pulley sections 3 and 4 to the driven pulley 1. Pulley section 3 having an almost plane face is fixed on motor shaft 5, whereas the conical section 4 is mounted axially and slidably on said shaft 5. Pulley section 4 is provided with a elongated hub 6, the terminal portion of which has the form of cams 7, which are of equal shape and in the area of which are located 2 rollers 8 which are solidly fixed on said shaft 5 thus forming an engaging lock, i.e. each of which transferring one half of the driving power of shaft 5 to pulley section 4. Shaft 5 ends at this side with a disc 9 or with bushing 9' (cf. FIGURE 3) serving as a support for compression spring 10. The prolonged hub 6 with cams 7 and rollers 8 form a load-dependent tension arrangement known as such. If, in the example shown, the distance between shafts 5 and 5' is increased, V-belt 2 remains in its running plane, but pulley section 4 shifts away from fixed pulley section 3 in axial direction, whereby a gearing to slow speed is effected. Depending on the direction of revolution, rollers 8 run up in the same direction on the oblique planes of curves 7, whereby V-belt 2 is imparted an additional tension dependent on the load. This additional tension is imparted to the belt in any regulation position independent on the direction of revolution. During the short time of a change of the direction of revolution or of the load, rollers 8 are not in contact with cams 7. During this time, the force of compression of compression spring 10 becomes effective, which during the period until rollers 8 abut to the opposite side of cams 7, secures that V-belt 2 is pressed by conical pulley section 4 and section 3 in such a manner that it always remains in tension, so that switching shocks are absorbed and weaving is avoided.

At the same time, the arrangement of cams 7 permits the maintenance of the speed of revolution between idle and full-load at an absolutely constant speed, even down to a reduction of the speed of revolution of the driving motor by 10% (asynchronous behaviour of the commercial three-phase short-circuit rotor motors).

This is effected automatically in the following manner: when a load is imposed on the motor or the driving gear, the torque and the pressure forces resulting therefrom, acting between cams 7 and rollers 8 become stronger, so that conical pulley section 4 presses by a small amount stronger against pulley section 3, whereby V-belt 2 is more compressed by these two pulley sections 3 and 4 and is thus forced to assume a higher diameter of revolution in the pair of regulating driving pulleys. (Upon reduction of the load bearing on the V-belt, it assumes automatically a smaller diameter.) This difference of running diameters, which is small as such, between idle and full-load, changes the gear ratio of the running diameters of the driving to the driven pulleys in such a manner, that the desired, stepless adjusted total reduction gear ratio remains always constant between idle and full load, thus securing constancy of the set driving speed.

If pulley section 3 and the corresponding opposite part of pulley 1 have the same thickness, V-belt 2 can be advantageously aligned by means of a ruler laid against the back of the pulleys.

As regards the V-belt itself, the asymmetric form thereof is known. This form is based on the consideration that it permits in advantageous manner to hold the belt in its running plane during regulation adjustments. These belts have not been intended for the transmission of higher powers and they are also not suited for this purpose, because they have not been provided with a cord reinforcement.

Figure 2:
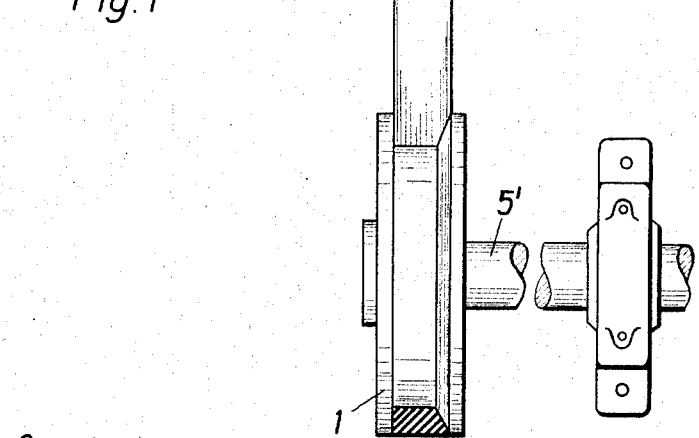
FIGURE 2 shows a cross-section of the V-belt of the invention.
Figure 2:
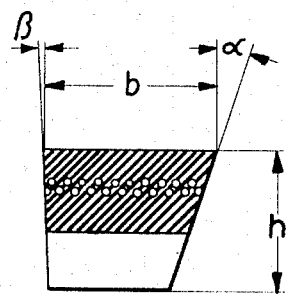

In contradistinction thereto, the V-belt of the present invention, which has the cross-section shown in FIGURE 2 and flank angles $\alpha$=19° and $\beta$=about 1°, offers the possibility of increasing the transmission of power on the average by about 40–50%, as compared to the transmission of power effected with known large width V-belts hitherto used for such driving gears; as has already been pointed out, the use of such belts is limited by their unfavorable height to width ratio.

A comparison of the V-belt of the cross-section shown with a V-belt having flanks that are inclined on both sides, at once reveals that the latter belt will automatically have a smaller range of regulation. In order to attain the same range of regulation, it would be necessary to make the belt wider. Thus, a compromise has been sought to make the belt somewhat wider while giving it steeper flanks in order not to come within inadmissible width proportions, while taking into account that thereby the belt comes within the range of belt self-locking.

Now, in order to increase the transmission of power, it has been found that a V-belt for the stepless control and for a control range as great as possible must have one almost plane flank and one other flank with an inclination which is just above the self-locking range, whereby the ratio of height to width $h:w$ of the belt can be maintained in favorable limits with a view to the desired regulation range, thus in such a maner thta the V-belt has a cross-section with high side stiffness and participates in the transmission with its whole surface.

Furthermore, it has been found very advantageous in the case of gears with great regulation range to give the conical pulley section 4 a slightly spherical form, so that in proximity of the axle it shows an inclination of about 18°, in the middle of the pulley section a mean angle of about 19° and at the peripherial part of the pulley section an angle of about 20°. In the case of a small running diameter, this assures that no squeezing of the belt occurs within the inner area of the belt with the conical pulley section because of deformation of the belt.

The use of the regulating V-belt of the invention is of course not limited to the described apparatus, but it can be used for all other constructions, for example, for driving devices with fixed shaft distance that operate with two or four pulley regulation. A particular possibility is the application in motor vehicle power train which mostly operate with a regulation range of $R=1:3$. In such cases, it is possible to increase the power transmission by 80%.

Furthermore, it should be noted that with equal transmission of power, the asymmetric V-belt permits to obtain a regulation range of $R=1:30$ to $R=1:40$ as compared to that of large width belts, the ratio of $h:w$ being in such a case in the range of about 1:4.8 to 1:5. Large control ranges exceeding 1:10 could hitherto been attained only by the use of servo gears such as toothed wheel gearings, two or multiple speed gearings or power branching gears or planetary wheel gears connected to the driving or to the driven side.

Figure 3:
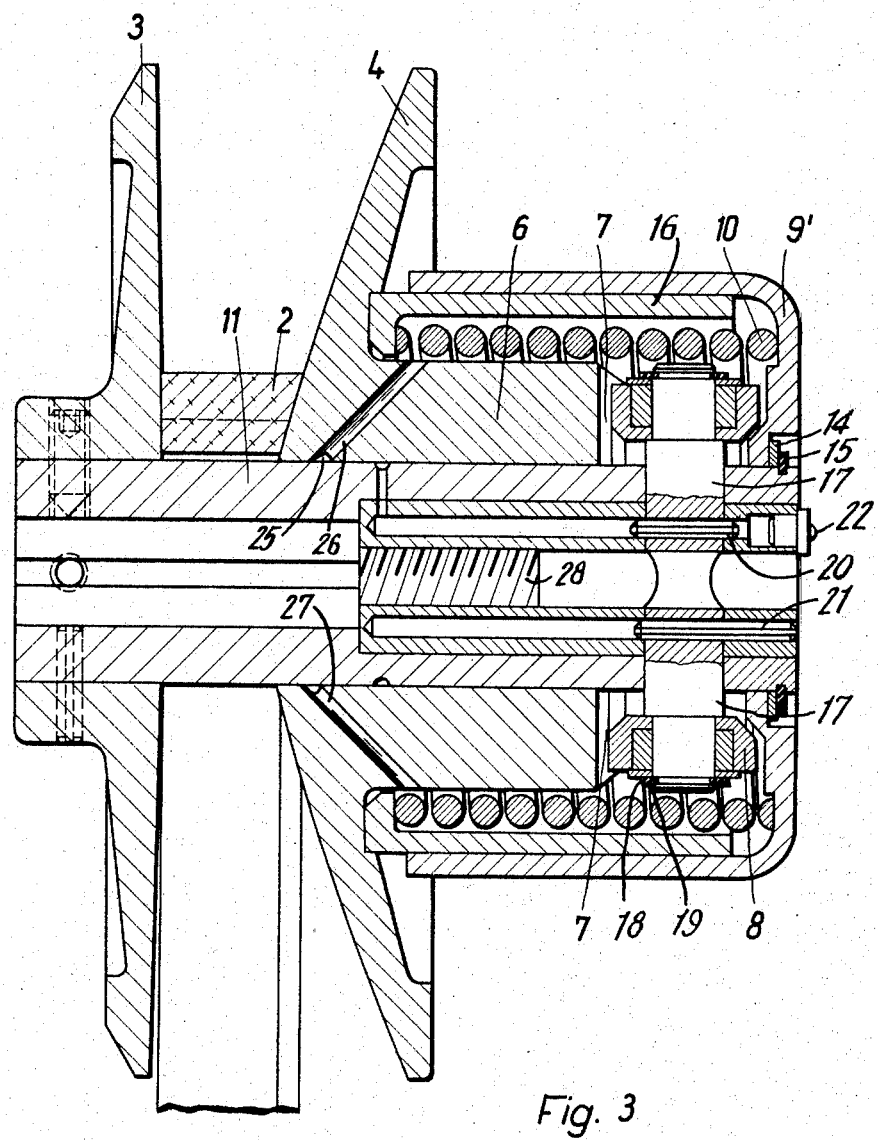
FIGURE 3 shows a cross-section of the upper set of pulleys shown in FIGURE 1.

FIGURE 3 shows in greater detail a set of regulating pulleys. It can be seen from this drawing the pulley sections 3 and 4 are mounted on a bushing 11 which is made of bronze. This material was selected with a view to a longer life-time and to the transmission of power. If the pulley sections would be fixed directly on shaft 5, a so-called fretting corrosion would occur sooner or later and this corrosion has a negative influence on the contact pressure of the pulley sections and thereby on the tension of the V-belt. This is prevented by the bronze material of bushing 11 and also by the corrosion-proof material of the conical pulley hub 6 which preferably consists of an aluminium alloy.

If the toothed belt shown in FIG. 2 is employed, it is contemplated that the hub of pulley 1 be provided with mating teeth.

Cup-shaped outer cover member 9' is secured to the end of bushing 11 by means of a washer 14 and a retaining ring 15. Inner cover member 16 is disposed within member 9' and is seated in an annular recess in the rear surface of pulley section 4. It will be seen that the two cover members are axially movable relative to each other and serve to enclose the spring member 10 and act as an oil retainer.

Rollers 8 are mounted on a transverse axle 17 which traverses the end of bushing 11. The rollers are secured by washers 18 and retaining rings 19. Pins 20 and 21 secure the axle to the bushing.

The device is lubricated by means of lubrication nipple 22. It will be noted that pin 21 is longer than pin 20 so that the weight of the lubrication nipple is counterbalanced. Oil passes through the bore of pin 20, to transverse aperture 23 and then to annular oil ring 24 to lubricate bushing 11. Excess oil is prevented from reaching belt 2 by groove 25 which drains excess oil into bores 26, 27.

Thread 28 is provided for insertion of a screw for achieving separation of the assembly from shaft 5. From FIG. 3 it will be appreciated that the thread is in a metallic insert portion which is pinned to bushing 11 by axle 17.

There has been disclosed heretofore the best embodiment of the invention presently contemplated and it is to be understood that various changes and modifications may be made by those skilled in the art without departing from the spirit of the invention.

What is claimed is:

1. In a variable speed power transmission system having a driving shaft movable relative to a fixed position pulley and an endless V-belt of asymmetric cross-section extending thereabout the combination therewith of:
   (a) a first pulley section rigidly secured to said driving shaft and having a face portion inclined between 0° and 1° to a plane transverse to said driving shaft, said pulley face portion being adapted to seat against one side face of said belt;
   (b) a second pulley section having a hub portion mounted concentrically about said driving shaft in axially sliding relationship thereto and a transverse face portion disposed in spaced opposition to the face portion of said first pulley, the face of said second pulley being inclined relative to a plane transverse said shaft to a substantially greater degree than said face portion of said first pulley and adapted to seat against the other side face of said belt, said hub portion having a diametric slot defined by side walls in the end thereof;
   (c) actuating means integrally secured to the end of said driving shaft and adapted to engage the diametric slot in said second pulley section; and
   (d) biasing means engaging said second pulley section for urging said second pulley section face toward said first pulley section face.

2. The apparatus in accordance with claim 1 wherein the face portion of said first pulley section is inclined at an angle of approximately 1 degree and said face portion of said second pulley section is inclined at an angle of approximatell 19 degrees.

3. The apparatus in accordance with claim 1 wherein the face portion of said second pulley is arcuate.

4. The apparatus in accordance with claim 1 wherein the diametric slot is formed with outwardly diverging side walls, the apex of the slot being inward of the end of said hub.

5. The apparatus in accordance with claim 1 wherein said actuating means comprises an axle secured transversely in the end of said driving shaft and at least one roller mounted on said axle, said roller being arranged to engage said side walls of the diametric slot in said second pulley section hub portion.

6. The apparatus in accordance with claim 5 wherein said axle extends on either side of said driving shaft and which includes a roller mounted on each end of said axle, said roller being arranged to engage a side wall of the diametric slot in said second pulley section hub portion.

7. A variable speed pulley for use with an asymmetrical V-belt and a driving shaft, said pulley comprising:
   (a) a hub adapted to be secured to the driving shaft;
   (b) a first pulley section secured to said hub and having a face portion inclined between 0° and 1° to a plane transverse to the driving shaft;
   (c) a second pulley section having a hub portion mounted concentrically about the driving shaft in axially sliding relationship thereto and a transverse face portion disposed in spaced opposition to the face portion of said first pulley, the face of said second pulley being inclined relative to a plane transverse the shaft, to a substantially greater degree than said face portion of said first pulley, said hub portion having a diametric slot defined by side walls in the end thereof;
   (d) actuating means integrally secured to the end of the driving shaft and adapted to engage the diametric slot in said second pulley section; and
   (e) biasing means engaging said second pulley for urging said second pulley section face towards said first pulley section face.

8. The apparatus in accordance with claim 7 wherein the face portion of said first pulley section is inclined at an angle of approximately 1 degree and said face portion of said second pulley section is inclined at an angle of approximately 19 degrees.

9. The apparatus in accordance with claim 7 wherein said face portion of said second pulley is arcuate.

10. The apparatus in accordance with claim 7 wherein the diametric slot is formed with outwardly diverging side walls, the apex of the slot being inward of the end of said hub.

11. The apparatus in accordance with claim 7 wherein said actuating means comprises an axle secured transversely in the end of the driving shaft and at least one roller mounted on said axle, said roller being arranged to engage said side walls of the diametric slot in said second pulley section hub portion.

12. The apparatus in accordance with claim 11 wherein said axle extends on either side of said driving shaft and which includes a roller mounted on each end of said axle, said roller being arranged to engage a side wall of the diametric slot in said second pulley section hub portion.

References Cited

UNITED STATES PATENTS

| | | | |
|---|---|---|---|
| 2,054,564 | 9/1936 | Quiroz | 74—230.17 |
| 2,276,186 | 3/1942 | Getchell | 74—230.17 |
| 2,446,310 | 8/1948 | Steinke | 74—237 |
| 2,711,103 | 6/1955 | Miner | 74—230.17 |
| 2,891,410 | 6/1959 | Papageorges | 74—230.17 |
| 2,905,005 | 9/1959 | Miner. | |

FOREIGN PATENTS

| | | |
|---|---|---|
| 373,611 | 3/1967 | France. |
| 1,188,334 | 3/1959 | France. |
| 695,248 | 8/1940 | Germany. |

MILTON KAUFMAN, *Primary Examiner.*

DAVID J. WILLIAMOWSKY, *Examiner.*

C. J. HUSAR, *Assistant Examiner.*